(12) United States Patent
Lloyd

(10) Patent No.: US 7,942,427 B2
(45) Date of Patent: May 17, 2011

(54) AIR SUPPLY SYSTEM FOR ACTIVE AIR SUSPENSION

(75) Inventor: Jeffrey M. Lloyd, Auburn Hills, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 117 days.

(21) Appl. No.: 12/428,544

(22) Filed: Apr. 23, 2009

(65) Prior Publication Data

US 2010/0270760 A1 Oct. 28, 2010

(51) Int. Cl.
*F16F 9/05* (2006.01)
*B60G 17/052* (2006.01)
*B60G 17/056* (2006.01)

(52) U.S. Cl. ........... 280/6.157; 280/5.514; 280/124.157; 267/64.27; 267/64.28

(58) Field of Classification Search ............... 280/5.503, 280/5.514, 6.157, 6.159, 124.157, 5.515, 280/5.5; 267/64.19, 64.21, 64.23, 64.24, 267/64.25, 64.27, 64.28, 64.16, 122; 188/298
See application file for complete search history.

(56) References Cited

U.S. PATENT DOCUMENTS

| 4,327,936 A | 5/1982 | Sekiguchi |
| 2005/0173851 A1 | 8/2005 | Lloyd |
| 2008/0290617 A1 * | 11/2008 | Bounds ........................ 280/5.5 |
| 2010/0230910 A1 * | 9/2010 | Kleckner et al. ............... 280/5.5 |
| 2010/0230911 A1 * | 9/2010 | Peterson ..................... 280/5.503 |
| 2010/0230912 A1 * | 9/2010 | Lloyd ......................... 280/5.503 |
| 2010/0230913 A1 * | 9/2010 | Peterson ..................... 280/5.503 |

FOREIGN PATENT DOCUMENTS

| DE | 3917245 | 11/1989 |
| DE | 10327485 | 1/2005 |
| EP | 0189063 | 9/1990 |

OTHER PUBLICATIONS

European Search Report dated Jul. 26, 2010.

\* cited by examiner

*Primary Examiner* — Ruth Ilan
*Assistant Examiner* — Keith Frisby
(74) *Attorney, Agent, or Firm* — Carlson, Gaskey & Olds

(57) ABSTRACT

An air suspension includes a plurality of air spring assemblies that each include a piston airbag and a primary airbag mounted over the piston airbag. The primary and piston airbags each have a variable volume that is controlled independently of the other for active suspension control. Each piston airbag includes a piston intake valve and a piston exhaust valve. Each primary airbag includes a control valve that is operable to supply and exhaust air from the corresponding primary airbag. The control valves and piston intake valves operate independently of each other. A compressor supplies air to a supply reservoir which is used to supply air to the primary and piston airbags. The compressor includes a bypass loop that directs exhausted air to a compressor inlet when the compressor is running.

20 Claims, 3 Drawing Sheets

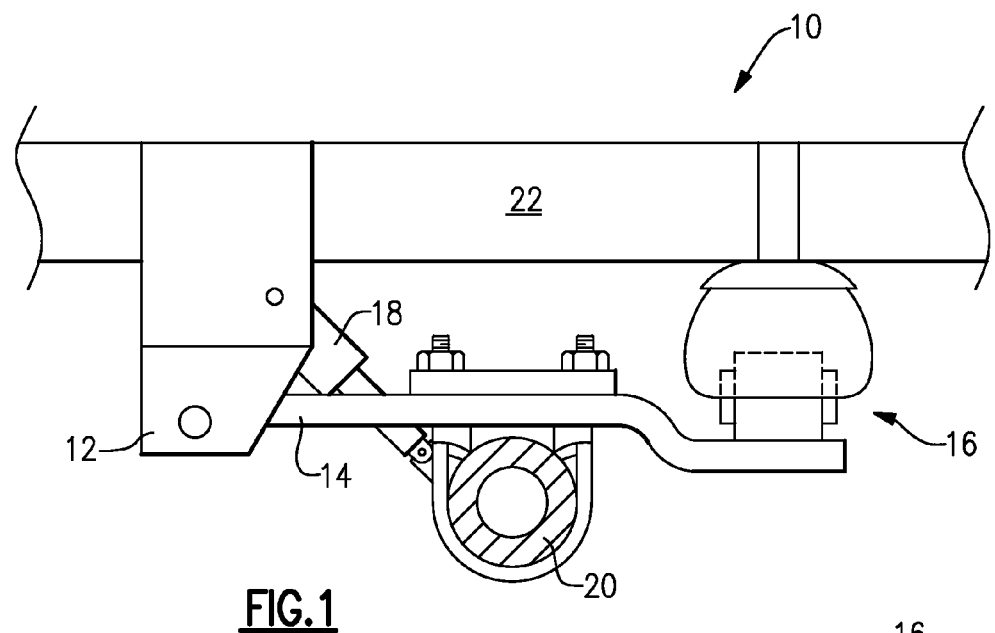
FIG.1
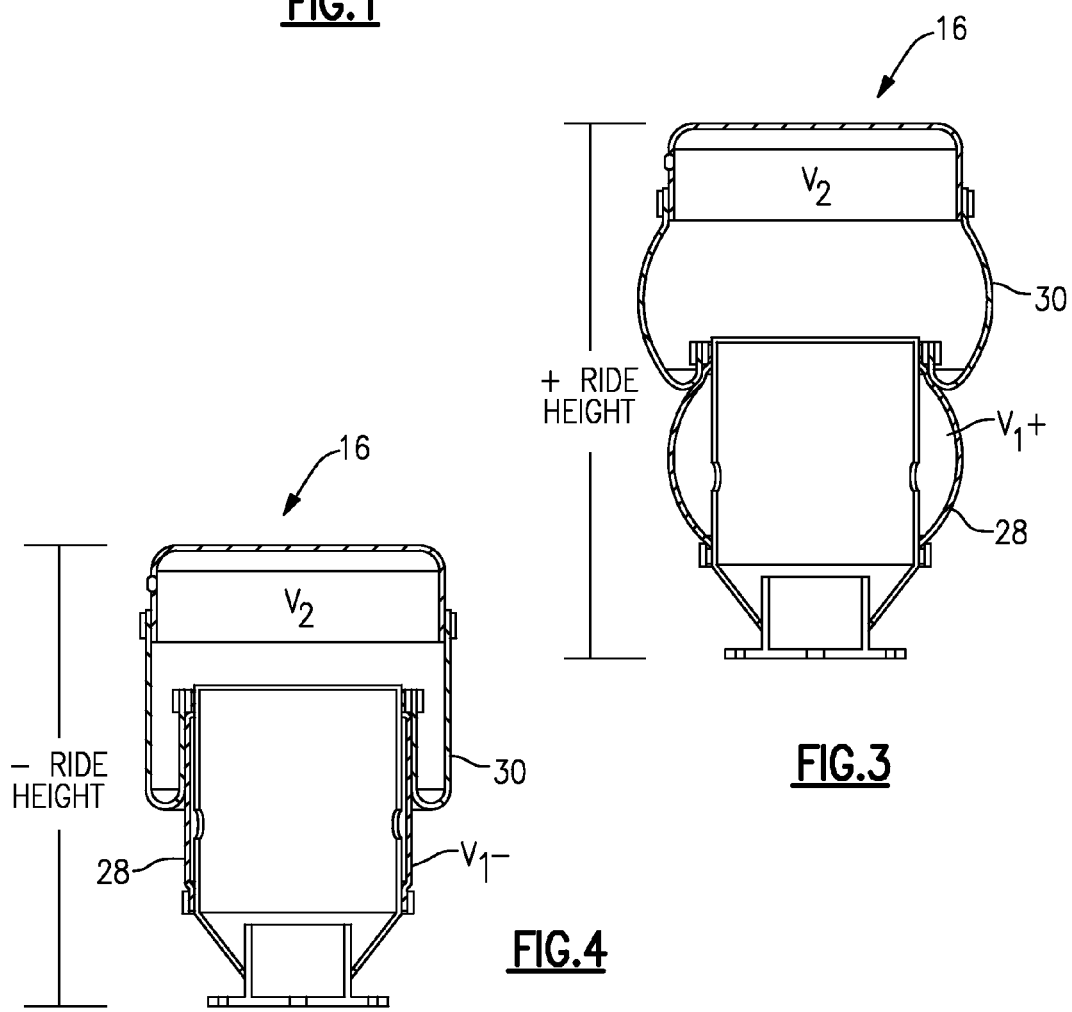
FIG.3
FIG.4

AIR SUPPLY SYSTEM FOR ACTIVE AIR SUSPENSION

TECHNICAL FIELD

This invention generally relates to an air supply system and control for an active air suspension.

BACKGROUND OF THE INVENTION

Air suspensions utilize air springs to provide desired output characteristics, such as ride comfort and vehicle performance for example. One known active air suspension uses an air spring assembly that includes a primary airbag mounted around a piston airbag such that the piston airbag provides a rolling surface for the primary airbag. A change in piston airbag volume changes an effective piston area of the primary airbag. A relatively small change in the effective piston area provides a change in a spring rate of the air spring assembly. The pressures in the piston airbag and the primary airbag are selectively controlled to provide continuous variation in spring rates without requiring any auxiliary tanks and associated actuators. The smaller volume of the piston airbag relative to the larger volume of the primary airbag permits rapid pressure and volume changes to enable active suspension control. An air supply system is needed to direct and control these volume changes.

SUMMARY OF THE INVENTION

An air supply system is used to control air supply to an active air suspension system. The active air suspension system includes a plurality of air spring assemblies that each include a piston airbag and a primary airbag mounted over the piston airbag. Each piston airbag includes a piston intake valve and a piston exhaust valve. Each primary airbag includes a control valve that is operable to supply and exhaust air from the corresponding primary airbag. The control valves and piston intake and exhaust valves operate independently of each other such that associated volumes of the primary and piston airbags can be varied independently of each other. A compressor assembly supplies air to a supply reservoir which is used to supply air to the primary and piston airbags.

In one example, the compressor assembly includes an intake and a dryer that removes moisture from the compressed air. Air exhausted from the piston airbags through the piston exhaust valves is used to regenerate the dryer. When the compressor is off, i.e. not refilling the supply reservoir, the exhausted air is directed into the dryer to regenerate the dryer. When the compressor is on, i.e. refilling the supply reservoir, exhausted air cannot be routed through the dryer for regeneration. A bypass is provided where the exhausted air is directed to a compressor inlet such that no additional moisture is introduced into the system while the compressor is running.

These and other features of the present invention can be best understood from the following specification and drawings, the following of which is a brief description.

BRIEF DESCRIPTION OF THE DRAWINGS

FIG. 1 is a general side view of one example of an active air suspension as installed on a vehicle.

FIG. 3 is a sectional view of the air spring in a first position.

FIG. 4 is sectional view of the air spring in a second position.

DETAILED DESCRIPTION OF THE PREFERRED EMBODIMENT

Figure 2:
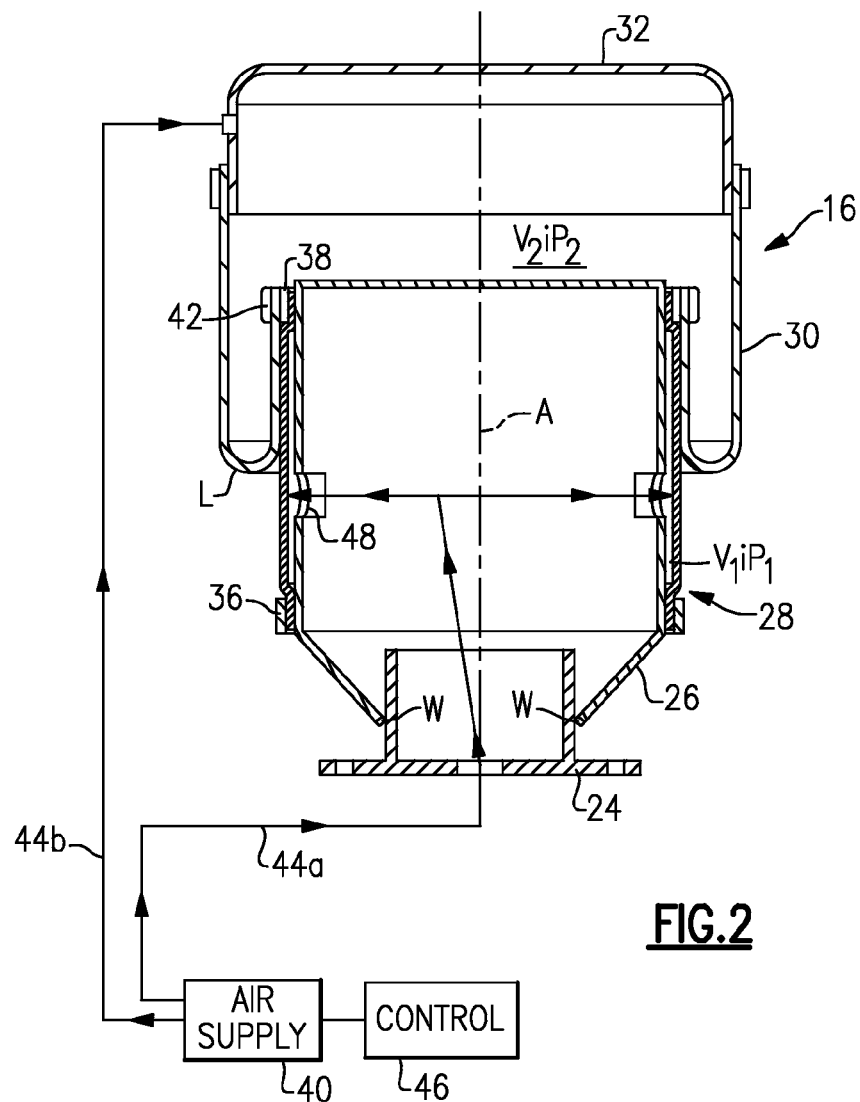
FIG. 2 is a sectional view of an air spring assembly as used in the active air suspension of FIG. 1.

FIG. 1 illustrates an air suspension system 10 for a vehicle. The air suspension system 10 generally includes a bracket 12, a longitudinal member 14, an air spring assembly 16, a damper 18, and an axle assembly 20. The air suspension system 10 is fixed to a frame or chassis of the vehicle (shown schematically at 22). The longitudinal member 14 could comprise a suspension arm, for example, and the axle assembly 20 could comprise any type of axle, such as a drive axle, non-drive axle, trailer axle, etc. The axle assembly 20 extends between laterally spaced wheels (not shown). It should be understood that the air suspension system 10 includes a longitudinal member 14, an air spring assembly 16, and a damper 18 at each lateral end of the axle assembly 20.

Referring to FIG. 2, the air spring assembly 16 is illustrated in cross-section. The air spring assembly 16 is defined along a central vertical axis A and includes a lower mount 24 (illustrated schematically), a piston support 26 attached to the lower mount 24, a piston airbag 28, and a primary airbag 30. An upper mount 32 is attached to the primary airbag 30. The upper 32 and lower 24 mounts provide attachment for the air spring assembly 16 between the longitudinal member 14 and chassis 22 (see FIG. 1).

The piston support 26 is a cylindrical member defined about the axis A. At the lower mount 24 the piston support 26 can be attached to many different structures such as a strut, shock, damper, or other similar mechanism, for example. In one example, the piston support 26 is attached to the lower mount 24 at welds W; however other attachment methods could also be used. The piston support 26 and the lower mount 24 are relatively rigid components.

The piston airbag 28 is a flexile, resilient member and is attached to the piston support 26 through a first band 36 and a second band 38. The first band 36 is secured at a lower end of the piston support 26 and the second band 38 is secured at an upper or opposite end of the piston support 26. While bands are shown, it should be understood that other attachment structures and/or methods could be used to secure the piston airbag 28 to the piston support 26. The piston airbag 28 defines a first volume V1 that is enclosed vertically between the bands 36, 38 and between an inner surface of the piston airbag 28 and an outer surface of the piston support 26.

The primary airbag 30 is mounted to the piston air bag 28 through a third band 42 which is spaced radially outwardly relative to the second band 38 with the primary airbag 30 being located between the second 38 and third 42 bands. In other words, the primary airbag 30 is sandwiched between the third band 42 and the second band 38. The primary airbag 30 defines a second volume V2. It should be understood that while two volumes V1, and V2 are disclosed in the illustrated embodiment, additional volumes could also be utilized within the spring assembly 16 as needed. Further, any of these volumes may be selectively segmented to provide further incremental volume changes.

An air supply system 40 (illustrated schematically in FIG. 2) communicates air independently into the volumes V1, V2 through a first 44a and second 44b supply conduits respectively in response to a controller 46 (illustrated schematically). The controller 46 is a suspension controller that provides active suspension control methodology. Ports 48 through the piston support 26 supply air into the first volume V1. The air supply system 40, which independently provides air pressure into the volumes V1, V2, will be discussed in greater detail below.

The piston airbag 28 operates as a rolloff piston surface for the primary airbag 30. In other words, the primary airbag 30 provides a rolling lobe L over a piston assembly having a variable diameter provided by the variable volume of the piston airbag 28. As the air spring assembly 16 experiences road load inputs, the lobe L of the primary airbag 30 rolls along the outer surface of the piston airbag 28. By changing the volume V1 or pressure P1 within the piston airbag 28 the outer diameter of the piston airbag 28 changes. A change in the piston airbag 28 volume V1 thereby changes the effective piston area of the primary airbag 30. It is also understood that the primary airbag 30 will exert a pressure P2 against the piston airbag 28, tending to reduce the outer diameter of the piston airbag 28 until an equilibrium diameter is reached. Therefore a change in pressure P1 will change the radial spring rate of the piston airbag 28 and change the equilibrium diameter also affecting the primary airbag spring rate.

Referring to FIG. 3, increasing the air pressure within the volume V1 increases the diameter of the piston airbag 28 to obtain a greater spring rate and ride height. That is, the increase in diameter of the piston airbag 28 results in an extension of the airbag assembly 16 as volume V1 effectively provides a larger rolloff piston. The opposite results are obtained when the pressure within the piston airbag 28 is reduced as volume V1 respectively decreases (FIG. 4). This reduces the ride height and spring rate.

A relatively small change in volume V1 provides a change in the spring rate of the primary airbag 30 as the diameter of the rolloff surface is selectively modified. A change in the pressure within the volume V1 couples a change in spring rate with a change in ride height when the pressure within volume V2 is maintained. The compression and rebound rates may alternatively be decoupled by simultaneously changing the volume of both V1 and V2.

By selectively controlling the pressure within volumes V1 and V2, infinite variation in spring rates are provided without an auxiliary tank and associated actuators. The relatively smaller volume of volume V1 relative to volume V2 permits rapid pressure and volume changes which enables active suspension control.

Figure 5:
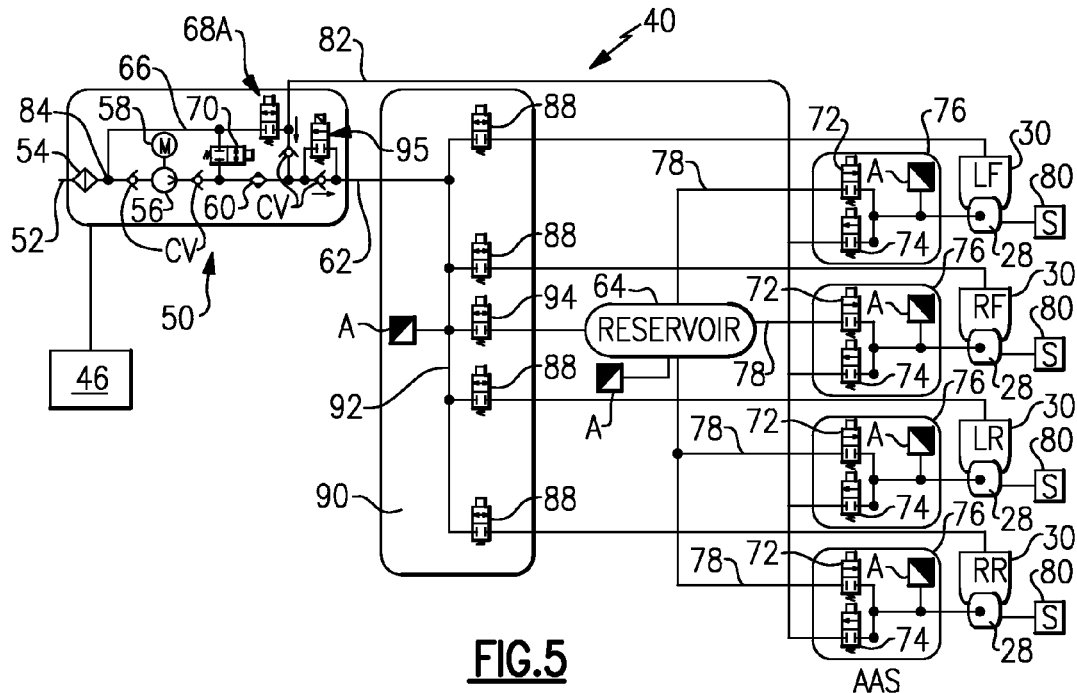
FIG. 5 is a schematic diagram depicting an air supply system for the active air suspension.

FIG. 5 illustrates the air supply system 40 in greater detail. The air supply system 40 includes a compressor assembly 50 having an intake 52, a filter 54 that removes contaminants from air drawn in through the intake 52, a pump 56 of the compressor driven by a motor 58, and a dryer 60 that removes moisture from the air compressed by the compressor. This dry air is then communicated via an outlet 62 either directly to the air spring assemblies 16 or to an air supply reservoir 64. Operation of the compressor assembly 50 is controlled by the controller 46.

The compressor assembly 50 also includes a bypass loop 66 with a bypass valve 68a. The bypass valve 68a is located downstream of the dryer 60. Operation of the bypass loop 66 will be discussed in greater detail below. The compressor assembly 50 also includes an exhaust valve 70 to exhaust air when needed and an exhaust valve 95 to provide dryer isolation. The compressor assembly 50 also includes a plurality of one-way check valves CV that limit air flow direction as indicated.

Each piston airbag 28 is fluidly connected to a piston intake valve 72 which is used to inflate the piston airbag 28 when needed. Each piston airbag 28 is also fluidly connected to a piston exhaust valve 74 which is used to deflate the piston airbag 28 when needed. Each piston airbag 28 also includes an associated piston valve block 76. Each piston valve block 76 includes one piston intake valve 72 and one piston exhaust valve 74. The piston valve blocks 76 are discrete blocks with one piston valve block 76 being associated with one piston airbag 28. The piston valve blocks 76 are positioned immediately adjacent to their associated piston airbag 28 to facilitate reaction times. However, the piston valve blocks 76 could also be mounted farther away.

The active system needs to be fast enough to react to primary body motions and thus requires a fast reaction time. The piston intake valves 72 that regulate flow to the piston airbag 28 are located in close proximity to the piston airbag 28 and associated flow conduits 78 are directly plumbed to the supply reservoir 64. The piston intake valves 72 can be either bi-state or proportional valves in order to precisely control the pressure within the piston airbag 28. A pressure sensor 80 is associated with each piston airbag 28 to provide a closed loop control of the pressure.

Figure 6:
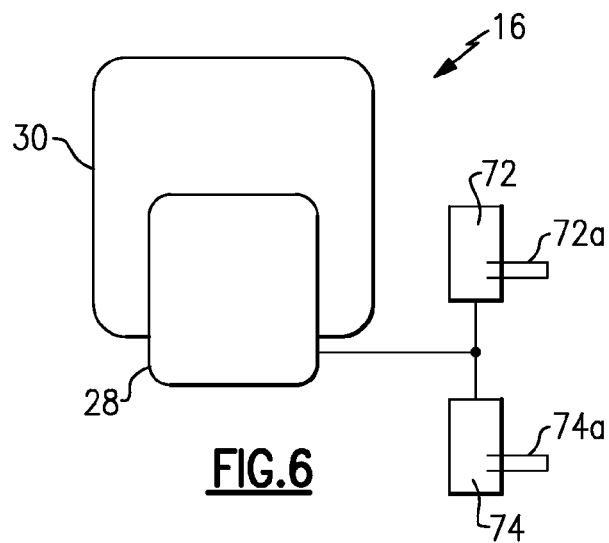
FIG. 6 is a schematic diagram depicting different orifice sizes for piston intake and exhaust valves.

The piston exhaust valve 74 is separate from the piston intake valve 72 so that different orifice sizes can be used to provide desired flow rates. Exit flow velocity is limited by the pressure drop to ambient pressure and orifices for the piston exhaust valves 74 and associated flow conduits 74a are therefore sized larger than the respective intake flow conduits 72a and intake orifices (see FIG. 6). In order to facilitate flow, larger air lines are used and additional expansion chambers may be installed to compensate for flow conduit length. However, the orifices could be the same size.

Air is exhausted through the piston exhaust valves 74 and is directed via an exhaust line 82 to the compressor assembly 50. This exhausted air from the piston airbag 28 is rerouted back through the dryer 60 to regenerate the air dryer media. Regeneration is required to keep moisture levels low in the system to avoid freezing of any of the valves. However, the air supply system 40 needs to be able to be exhausted at any moment in time. When the compressor assembly 50 is refilling the supply reservoir 64, the dryer 60 is experiencing the high pressure flow of the compressed air and is therefore unavailable for low pressure exhaust flow from the piston exhaust valves 74.

When the compressor assembly 50 is in a compressor "off" condition, i.e. the compressor assembly 50 is not refilling the supply reservoir 64, the exhausted air from the piston exhaust valves 74 flows through the dryer 60, regenerates desiccant dryer media, and is then exhausted through the exhaust valve 70 in an "open" system configuration. When the compressor assembly 50 is in a compressor "on" condition, i.e. the compressor assembly 50 is refilling the supply reservoir 64, the bypass valve 68a directs the exhaust air through the bypass loop 66 to an inlet 84 to the compressor such that dry exhaust air is re-circulated into the compressor assembly 50 without further moisture loading of the dryer 60. This replicates or mimics a "closed system" configuration although only for certain moments and without closing off the intake air, i.e. the system can operate momentarily as a closed system without requiring a shut-off valve at the intake. The exhaust flow is metered such that the intake rate into the compressor assembly 50 overwhelms the re-circulated air and system air experiences minimal leakage out through the intake flow.

Each primary airbag 30 is fluidly connected to a control valve 88. Each control valve 88 controls air flow into and out of the primary airbag 30. The control valves 88 are located within a common valve block 90 that can be part of a standard air suspension. The common valve block 90 includes a main supply line 92. An additional control valve 94 controls air supply to and from the supply reservoir 64 via the main supply line 92. Each of the control valves 88 are positioned downstream of the main supply line 92. When a primary airbag 30 is to be filled with air, the additional control valve 94 is opened and then the appropriate control valves 88 are opened to direct air flow to the primary airbags 30 that need to be filled. Optionally, the control valves 88 can be selectively opened and air from the compressor assembly 50 can be communicated directly to the primary airbags 30. Exhausting of the primary airbags 30 occurs when the control valves 88 are selectively opened with the exhaust valves 95 and 70. Pressure in the reservoir 64 is monitored by a pressure sensor A.

Figure 7:
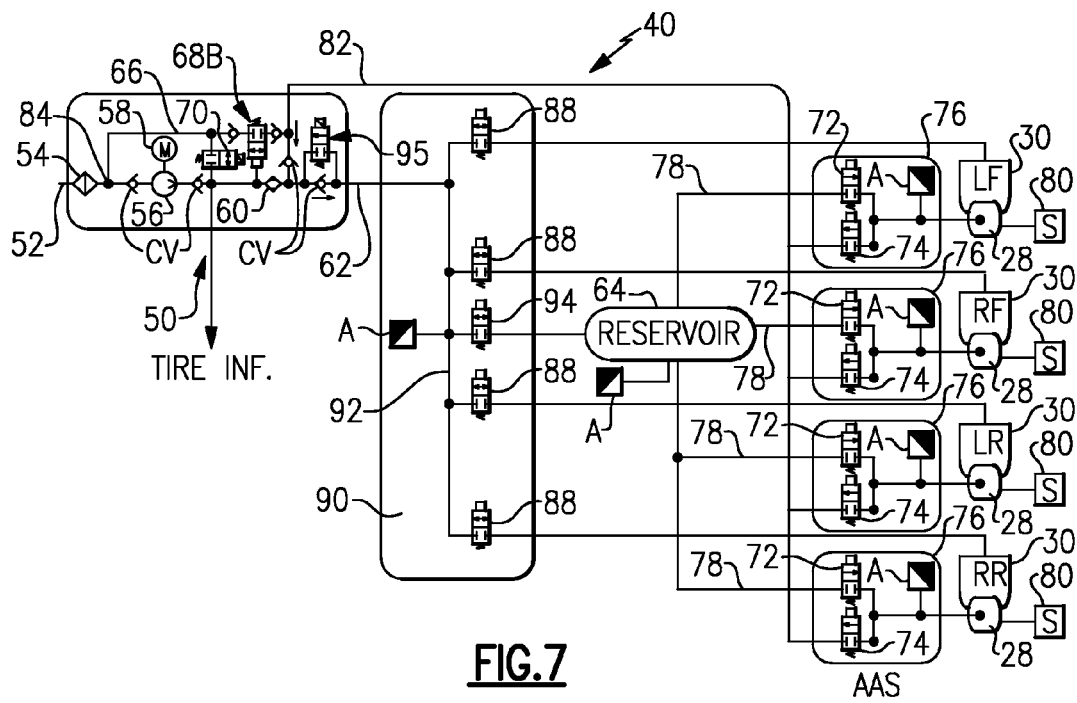
FIG. 7 is another schematic diagram depicting an air supply system for the active air suspension.

FIG. 7 shows an alternate schematic eliminating the requirement of additional I/O from the controller 46. The valve 68b replaces the valve 68a and is piloted by high pressure air in the dryer 60. This opens a bypass circuit when the dryer 60 is unusable for regeneration of the piston exhaust air. A secondary stage of the valve 68b also provides for a high pressure relief valve through the pilot flow back to the inlet 84. Additional check valves are required to direct the flow during different exhaust events.

The above example shows a four corner, i.e. four wheel, air suspension system schematic. The modular design allows for both conventional and active systems to be fitted to a vehicle platform. As discussed above, the compressor provides a high pressure air source to either a supply reservoir or directly to the air springs. The system uses the common valve bock from a standard air suspension system to direct air between the primary airbag and the reservoir and uses discrete piston valve blocks to quickly direct air between the piston airbags and the reservoir. It should be under stood that while the schematic shows a four corner configuration, the system could also be applied to a 2 corner system or a system with additional wheels.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An air supply system for an active air suspension comprising:
   a plurality of air spring assemblies, each air spring assembly including a piston airbag and a primary airbag mounted around said piston airbag such that said piston airbag provides a rolling surface for said primary airbag;
   a piston intake valve for each piston airbag;
   a piston exhaust valve for each piston airbag;
   a control valve for each primary airbag;
   a supply reservoir to supply air to said piston airbags and said primary airbags; and
   a compressor assembly including an intake and an output to supply air to said supply reservoir.

2. The air supply system according to claim 1 wherein said control valves operate to supply and exhaust air from said primary airbags, said control valves operating independently of said intake valves.

3. The air supply system according to claim 1 wherein each piston intake valve is positioned immediately adjacent an associated one of said piston airbags, and wherein each piston intake valve is directly connected to said supply reservoir via a supply conduit.

4. The air supply system according to claim 1 wherein said piston intake valves define a first orifice size and said piston exhaust valves define a second orifice size different than said first orifice size.

5. The air supply system according to claim 4 wherein said second orifice size is greater than said first orifice size.

6. The air supply system according to claim 1 including a controller that communicates a control signal to said compressor assembly to supply air to said primary airbags and said piston airbags, said control signal to control air supply to said primary airbags via said control valves independently from supplying air to said piston airbags via said intake valves.

7. The air supply system according to claim 1 wherein said compressor assembly includes a dryer that supplies dry air to said output, and wherein said dryer receives exhausted air from said piston exhaust valves to regenerate said dryer under a first compressor condition and wherein exhaust air from said piston exhaust valves is supplied to a compressor inlet under a second compressor condition.

8. The air supply system according to claim 7 wherein said first compressor condition comprises a compressor "off" condition and said second compressor condition comprises a compressor "on" condition.

9. The air supply system according to claim 1 wherein said compressor assembly includes a dryer and a bypass loop with a bypass valve positioned downstream of said dryer, said bypass valve to direct exhausted air from said piston exhaust valves from a position downstream of said dryer to a position upstream of said dryer when said compressor assembly is refilling said supply reservoir.

10. The air supply system according to claim 1 wherein said control valves for said primary airbags are supported within a common valve block, and including a plurality of discrete piston valve blocks, with each piston valve block including one piston exhaust valve and one piston intake valve.

11. The air supply system according to claim 10 wherein said plurality of air spring assemblies comprise four air spring assemblies with each of said four air spring assemblies being associated with one wheel of a four wheel vehicle configuration, and wherein said plurality of piston valve blocks comprise four piston valve blocks with each piston valve block being associated with one wheel of the four wheel vehicle configuration.

12. The air supply system according to claim 11, wherein said common valve block includes a main supply conduit that is fluidly connected to said output of said compressor assembly, and wherein said plurality of control valves comprise five control valves with one of the five control valves bi-directionally controlling air flow to and from said supply reservoir via said main supply conduit, and the remaining control valves each being located downstream of said main supply conduit with each of the remaining control valves being associated with one primary airbag of said four air spring assemblies.

13. A method of supplying air to an active air suspension comprising the steps of:
   (a) providing a plurality of air spring assemblies, each air spring assembly including a piston airbag and a primary airbag mounted around the piston airbag such that the piston airbag provides a rolling surface for the primary airbag;
   (b) fluidly connecting a separate piston intake valve to each piston airbag to supply air to the piston airbag from a supply reservoir;
   (c) fluidly connecting a separate piston exhaust valve to each piston airbag;

(d) fluidly connecting a separate control valve to each primary airbag to supply air to the primary airbag from the supply reservoir independently of supplying air to the piston airbags; and (e) supplying compressed air to the supply reservoir with a compressor assembly.

14. The method according to claim 13 including drying air supplied to the supply reservoir with a dryer, and regenerating the dryer with exhausted air supplied by the piston exhaust valves when the compressor assembly is off.

15. The method according to claim 14 including fluidly communicating exhausted air from the piston exhaust valves from a location downstream of the dryer to a position upstream of the dryer when the compressor assembly is on such that exhausted air is recycled through the dryer without introducing additional moisture into the dryer.

16. The method according to claim 13 including providing a common valve block for the control valves and providing a plurality of discrete piston valve blocks with each piston valve block including one piston intake valve and one piston exhaust valve, and including the steps of positioning each piston valve block immediately adjacent one of the air spring assemblies.

17. An air supply system for an active air suspension comprising:
a plurality of air spring assemblies, each air spring assembly including a piston airbag and a primary airbag mounted around said piston airbag such that said piston airbag provides a rolling surface for said primary airbag;
a discrete piston valve bock for each piston airbag;
a common valve block for said primary airbags;
a supply reservoir to supply air to said piston airbags and said primary airbags;
a compressor assembly that provides a high pressure air source to said supply reservoir and directly to said air spring assemblies; and
a controller that communicates a control signal to said compressor assembly to independently supply air to said primary airbags via said common valve block and to each piston airbag via a respective discrete piston valve block.

18. The air supply system according to claim 17 wherein each discrete piston valve block includes at least a piston intake valve and a piston exhaust valve, and wherein said common valve block includes a separate control valve for each primary airbag.

19. The air supply system according to claim 17 including a pressure sensor for each piston airbag that communicates piston airbag pressure data to said controller to provide closed loop control.

20. The air supply system according to claim 17 wherein said compressor assembly switches between an "on" state and an "off" state, and wherein when said compressor assembly is in said "off" state exhaust flow from said air spring assemblies can be directed through a dryer for regeneration purposes and is subsequently exhausted from the air supply system in an open system condition, and wherein when said compressor assembly is in said "on" state a secondary exhaust valve directs piston exhaust flow into a compressor inlet in a closed system condition.

\* \* \* \* \*